(12) United States Patent
Mathai et al.

(10) Patent No.: US 9,267,567 B2
(45) Date of Patent: Feb. 23, 2016

(54) SWITCHABLE ENGINE MOUNT AND METHOD FOR OPERATION THEREOF

(71) Applicant: Ford Global Technologies, LLC, Dearborn, MI (US)

(72) Inventors: Thomas Mathai, Farmington, MI (US); Brian Douglas Ross, Marine City, MI (US); Michael Fsadni, Livonia, MI (US); Bhavin Patel, Canton, MI (US); Nigel King, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 14/020,522

(22) Filed: Sep. 6, 2013

(65) Prior Publication Data

US 2014/0339748 A1 Nov. 20, 2014

Related U.S. Application Data

(60) Provisional application No. 61/824,241, filed on May 16, 2013.

(51) Int. Cl.
*F16F 9/10* (2006.01)
*F16F 15/027* (2006.01)
*B60K 5/12* (2006.01)

(52) U.S. Cl.
CPC ............... *F16F 9/10* (2013.01); *B60K 5/1283* (2013.01); *F16F 15/027* (2013.01)

(58) Field of Classification Search
CPC ............. F16F 9/10; F16F 9/34; F16F 9/3415; F16F 13/26; F16F 13/262; F16F 15/027; F16F 15/0275; F16F 15/023; B60K 5/1275; B60K 5/1283
USPC .......................................... 267/140.14, 140.15
See application file for complete search history.

(56) References Cited

U.S. PATENT DOCUMENTS

| 4,648,576 A | * | 3/1987 | Matsui ..................... 267/140.14 |
| 6,361,031 B1 | | 3/2002 | Shores et al. |
| 6,799,754 B1 | * | 10/2004 | Bodie et al. .............. 267/140.14 |
| 7,036,804 B2 | | 5/2006 | Bodie et al. |

FOREIGN PATENT DOCUMENTS

| EP | 972964 A2 | * | 1/2000 |
| GB | 2339609 A | * | 2/2000 |
| GB | 2359607 A | * | 8/2001 |

* cited by examiner

*Primary Examiner* — Thomas J Williams

(74) *Attorney, Agent, or Firm* — Julia Voutyras; Alleman Hall McCoy Russell & Tuttle, LLP

(57) ABSTRACT

A switchable engine mount is provided. The switchable engine mount includes an end plate including one or more openings in fluidic communication with a hydraulic source and a channel plate coupled to the end plate and including one or more hydraulic flow openings. The switchable engine mount further includes a decoupler including at least one decoupler plate at least partially enclosed by the channel plate and the end plate and a switching plate positioned adjacent to the decoupler and configured to axially actuate the decoupler in response to reception of an input force from an actuator, the input force non-parallel to the axially actuation.

19 Claims, 7 Drawing Sheets

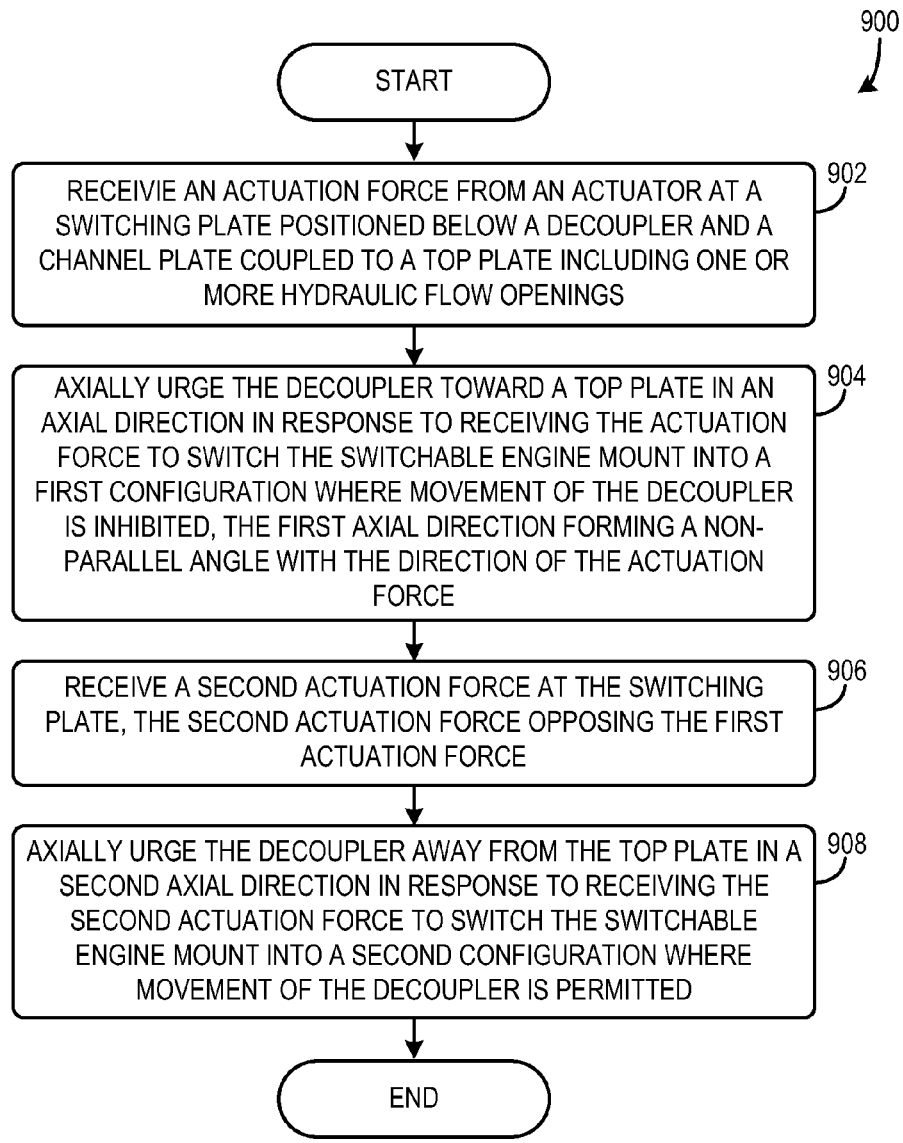

SWITCHABLE ENGINE MOUNT AND METHOD FOR OPERATION THEREOF

CROSS REFERENCE TO RELATED APPLICATIONS

The present application is a non-provisional of and claims priority to U.S. Provisional Patent Application No. 61/824,241, filed on May 16, 2013, the entire contents of which are hereby incorporated by reference for all purposes.

FIELD

The present disclosure relates to an engine mount and method for operation of an engine mount.

BACKGROUND AND SUMMARY

Engine mounts may be used to attach engines to vehicle frames or other suitable structural vehicle elements. However, the engine and/or vehicle may generate vibrations during operation. Therefore, hydraulic dampening engine mounts have been developed to attenuate engine vibrations during vehicle operation. Hydraulic engine mounts may provide several configurations, enabling the dampening provided by the mount to be adapted for different operating conditions. For instance, engines mounts may have a first configuration for idle operation dampening and a second configuration for motive engine operation dampening.

U.S. Pat. No. 7,036,804 discloses an adaptive hydraulic engine mount having a solenoid valve operable to axially adjust a valve sealing element to change the level of dampening provided by the hydraulic mount. However, the inventors have recognized several drawbacks with the hydraulic engine mount disclosed in U.S. Pat. No. 6,361,031. For example, actuating the solenoid valve requires an axial force that must overcome the hydraulic pressure in the mount. As a result, the size of the solenoid valve and corresponding components may be increased to provide a required amount of actuation force to overcome the hydraulic pressure. Additionally, the cost of the hydraulic mount may be increased when the aforementioned components are increased in size.

The inventors herein have recognized the above issues and developed a switchable engine mount. The switchable engine mount includes an end plate including one or more openings in fluidic communication with a hydraulic source and a channel plate coupled to the end plate and including one or more hydraulic flow openings. The switchable engine mount further includes a decoupler including at least one decoupler plate at least partially enclosed by the channel plate and the end plate and a switching plate positioned adjacent to the decoupler and configured to axially actuate the decoupler in response to reception of an input force from an actuator, the input force non-parallel to the axially actuation.

In this way, an actuation force may be applied is a direction that does not oppose an axial hydraulic force in the mount, thereby decreasing an amount of actuation force needed to actuate the mount from a first to a second configuration or vice-versa. The technical results achieved via the switchable engine mount include decreasing the actuation force needed for actuation of the switchable engine mount when compared to mounts which utilize axial actuation forces. As a result, the size of various components in the engine mount may be decreased, thereby decreasing the cost of the engine mount and increasing packaging efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 9 shows a method for operation of a switchable engine mount.

FIGS. 2-8 are drawn approximately to scale, however other relative dimensions may be used if desired.

DETAILED DESCRIPTION

A switchable engine mount for attenuating engine and vehicle vibrations is described herein. The switchable engine mount has a first configuration where movement of a decoupler is inhibited by a switchable plate and a top plate and a second configuration where movement of the decoupler in a channel plate is permitted. The mount may be switched into the aforementioned configurations via an input force received by the switchable plate. In response to receiving the input force the switchable plate may be urged axially towards or away from the top plate. The input force is non-parallel to the axially movement of the switchable plate. In this way, the input force does not oppose the general direction of hydraulic force applied to the mount, decreasing the magnitude of the input force needed for actuation. As a result, the size and cost of the switchable engine mount may be decreased, if desired. Additionally, the packaging efficiency of the switchable engine mount may be increased when the size of the switchable engine mount is decreased.

Figure 1:
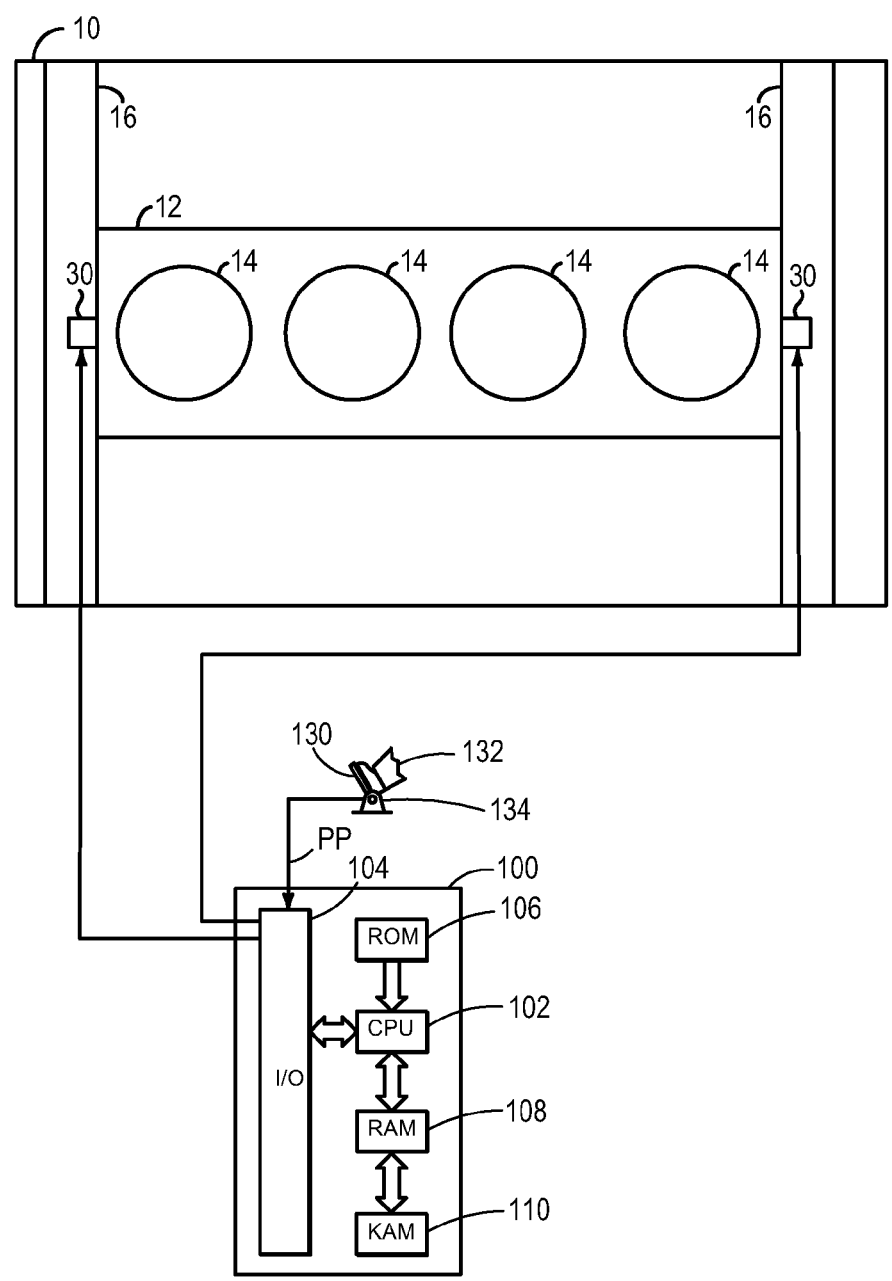
FIG. 1 shows a schematic depiction of a vehicle including an engine mounted to a vehicle frame via switchable engine mounts.

FIG. 1 shows a schematic depiction of a vehicle 10 including an engine 12. The engine 12 is configured to implement combustion operation in cylinders 14. For example, a four stroke combustion cycle may be implemented including an intake stroke, a compression stroke, a power stroke, and an exhaust stroke. However, other types of combustion cycles may be utilized in other examples. Although the engine 12 is depicted with four cylinders in an inline configuration, engines having an alternate number of cylinders and/or cylinder configurations have been contemplated. It will be appreciated that the engine 12 may include an intake system configured to provide air to the cylinders 14 and an exhaust system configured to receive exhaust gas from the cylinders.

The vehicle 10 includes a vehicle frame 16. The vehicle frame 16 may include one or more tubes, beams, pipes, etc. Switchable engine mounts 30 (e.g., hydraulic switchable engine mounts) couple the engine 12 to the vehicle frame 16. The switchable engine mounts 30 are configured to provide vibration dampening to the engine 12, to decrease the amount of vibration translated to the vehicle frame 16 from the engine 12 or vice-versa. The switchable engine mounts 30 may be switchable in at least a first configuration and a second configuration. The configurations may provide different dampening characteristics and are discussed in greater detail herein.

A controller 100 may be included in the vehicle. The controller 100 may be configured to receive signals from sensors in the vehicle as well as send command signals to components such as the switchable engine mounts 30 to adjust operation of the components.

Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the switchable engine mounts 30 receive control signals, indicated via arrows 40, from the controller 100. In this way, the controller can adjust the configuration of the switchable engine mounts, if desired. Consequently, the switchable engine mounts may be altered based on the engine operating conditions. For instance, the configuration of the engine mounts may be adjusted based on engine speed to dampen vibrations generated by the engine.

FIGS. 2-8 show an example switchable engine mount 200 and specific components included in the switchable engine mount. The switchable engine mount 200 may be a switchable engine mount assembly. Additionally, the switchable engine mount 200 shown in FIGS. 2-8 may be one of the switchable engine mounts 30, shown in FIG. 1.

Figure 2:
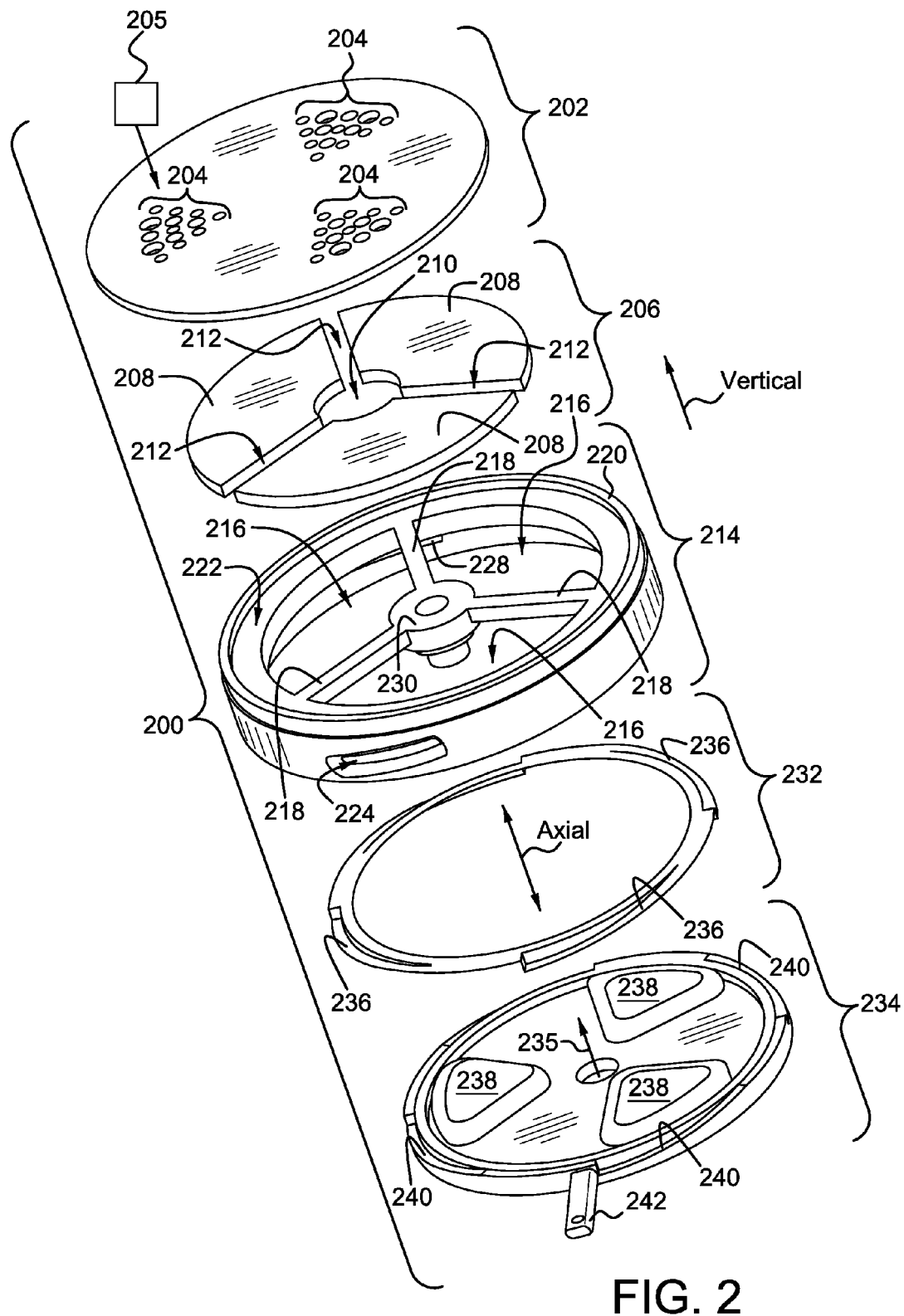
FIG. 2 shows an exploded view of a switchable engine mount.

Specifically, FIG. 2 shows an exploded view of the switchable engine mount 200. The switchable engine mount 200 includes an end plate 202. The end plate is circular in the depicted example. However, oval and rectangular end plates have been contemplated. The end plate 202 may be a top plate, in some examples. A vertical axis is provided for reference. However, other switchable engine mount orientations have been contemplated.

The end plate 202 includes one or more openings. Specifically, in the depicted example the end plate 202 includes a plurality of opening groups 204, each of the opening groups includes a plurality of openings. The plurality of openings vary in size, in the depicted example. However, groups of openings having equivalently sized openings have been contemplated. The openings may be in fluidic communication with a hydraulic source 205, in some examples. The hydraulic source may be a hydraulic chamber. The hydraulic chamber may be in the switchable engine mount. Thus, hydraulic fluid may flow through the opening during some operating conditions. Further in some examples the hydraulic source may be a hydraulic line in an engine or vehicle system.

The switchable engine mount 200 further includes a decoupler 206. The decoupler 206 is positioned adjacent to the end plate 202 and below the end plate. However, other decoupler positions have been contemplated. The decoupler 206 includes one or more decoupler plates 208. Specifically in the depicted example, the decoupler 206 includes three decoupler plates. However, a decoupler having an alternate number of plates has been contemplated. Each of the decoupler plates span different radial ranges (e.g., circular segments). The decoupler plates 208 are spaced away from one another forming gaps 212, in the depicted example. Additionally, the decoupler 206 includes a central opening 210.

The switchable engine mount 200 further includes a channel plate 214. The channel plate 214 includes openings 216 (e.g., hydraulic flow openings), radial extensions 218, and an outer section 220. The radial extensions 218 are radially aligned in the depicted example. However, other alignments of the extensions have been contemplated. The channel plate 214 further includes a recess 222 configured to receive the end plate 202 when assembled. Likewise, the openings 216 may receive the decoupler plates 208 when assembled. Thus, the openings 216 may guide the movement of the decoupler plates 208 when assembled. The channel plate 214 further includes an actuation arm opening 224 configured to receive an actuation arm when assembled, discussed in greater detail herein. The actuation arm opening 224 extend in an axial and circumferential direction in the depicted example. The channel plate 214 further includes angled ramps 228 extending in a radial and axial direction. The angled ramp 228 may be in direct contact (e.g., face sharing contact) with a correspondingly contoured angled ramp 240 in a switching plate 234 of the switchable engine mount 200. The channel plate 214 further includes a central section 230 (e.g., central ring). The radial extensions 218 extend between the outer section 220 and the central section 230.

The switchable engine mount 200 further includes a ramp element 232 positioned between the channel plate 214 and a switching plate 234. It will be appreciated that in other examples the ramp element 232 may be omitted from the switchable engine mount 200. The ramp element 232 may have similar contours to the switching plate 234. Specifically, the ramp element 232 includes a plurality of angled ramps 236 extending in an axial and/or circumferential direction. It will be appreciated that the ramp element 232 may be included in the switchable engine mount 200 to increase the durability of the mount.

The switching plate 234 may be attached to the channel plate 214 and may rotate about an axis 235. The switching plate 234 includes a plurality of actuation protrusions 238. The actuation protrusions 238 are configured to urge the decoupler plates 208 in a vertical direction during actuation of the switchable engine mount 200 to switch the mount into a first configuration where the decoupler plates 208 are substantially inhibited from moving. Furthermore, it will be appreciated that the actuation protrusions 238 may be in contact (e.g., face sharing contact) with the decoupler plates 208 when in the first configuration. In the second configuration the decoupler plates 208 may be permitted to move by urging the actuation protrusions in a downward direction. The second configuration may provide higher dampening rates than the first configuration, in one example.

The switching plate 234 includes a plurality of angled ramps 240. The angled ramps 240 may be correspondingly contoured with the angled ramps 228. Thus, the angled ramps 240 may be in face sharing contact with the angled ramps 228 when the switchable engine mount 200 is assembled and the ramp element 232 is not included in the mount. However, it will be appreciated that in the example shown in FIG. 2 the ramp element 232 may be in face sharing contact with the switching plate 234 and the angled ramps 236 may be in face sharing contact with the channel plate angled ramps 228.

As shown, the angled ramps (228, 236, and 240) extend in an axial direction. Additionally, the angled ramps (228, 236, and 240) extend in a circumferential direction. Specifically, the angled ramps may be helically arranged. However, angled ramps having alternate geometries have been contemplated, for instance, the switchable engine mount may have an oval geometry, in another example. Further, in another example the switchable engine mount may have a rectangular geometry. In such an example, the angled ramps may extend in a vertical and longitudinal direction.

The switching plate 234 further includes an actuation arm 242 extending in a radial direction. However, other actuation arm orientations have been contemplated. For example, the actuation arm 242 may be arranged at any non-parallel angle with regard to a central axis of the switchable engine mount 200. The central axis of the mount may be the rotational axis of the switching plate. The actuation arm 242 may extend through the actuation arm opening 224 when the switchable engine mount 200 is assembled.

An actuator may apply an actuation force (e.g., rotational actuation force) to the switching plate 234 via the actuation arm 242 or other suitable element. Thus, the switching plate 234 may receive an actuation force (e.g., rotational or horizontal actuation force). It will be appreciated that the actuation force may be in a direction non-parallel to the rotational axis of the switching plate 234 and/or the vertical axis. In one example, the actuation force direction may be perpendicular to the direction of hydraulic effects in the mount. The angled ramps (228, 236, and 240) enable the actuation force (e.g., rotational or horizontal actuation force) to be transferred into axial movement (e.g., vertical movement) of the switching plate 234. The axial movement of the switching plate 234 enables the actuation protrusions 238 to move towards or away from the decoupler plates 208. Specifically, the switchable engine mount 200 may be actuated in a first configuration where decoupler plates 208 are substantially inhibited from moving and in face sharing contact with a surface of the end plate 202 and the actuation protrusions 238. In a second configuration the switchable engine mount 200 may enable axial movement of the decoupler plates 208. Therefore, in the second configuration the decoupler plates 208 may be spaced away from the end plate 202. In the second configuration axial movement of the decoupler plates 208 is permitted. Therefore, in the second configuration the position of the decoupler plates 208 may be passively moved to facilitate dampening in the switchable engine mount 200. Specifically, the variation in pressure of the fluid in the mount may cause movement of the decoupler plates 208.

It will be appreciated that the switchable engine mount 200 may include additional components such as diaphragms, fluid chambers (e.g., pumping chambers, fluid cavity), etc., configured to facilitate the aforementioned functionality. It will be further appreciated that a vehicle frame such as the vehicle frame 16 shown in FIG. 1 may be coupled to the switchable engine mount 200.

Figure 3:
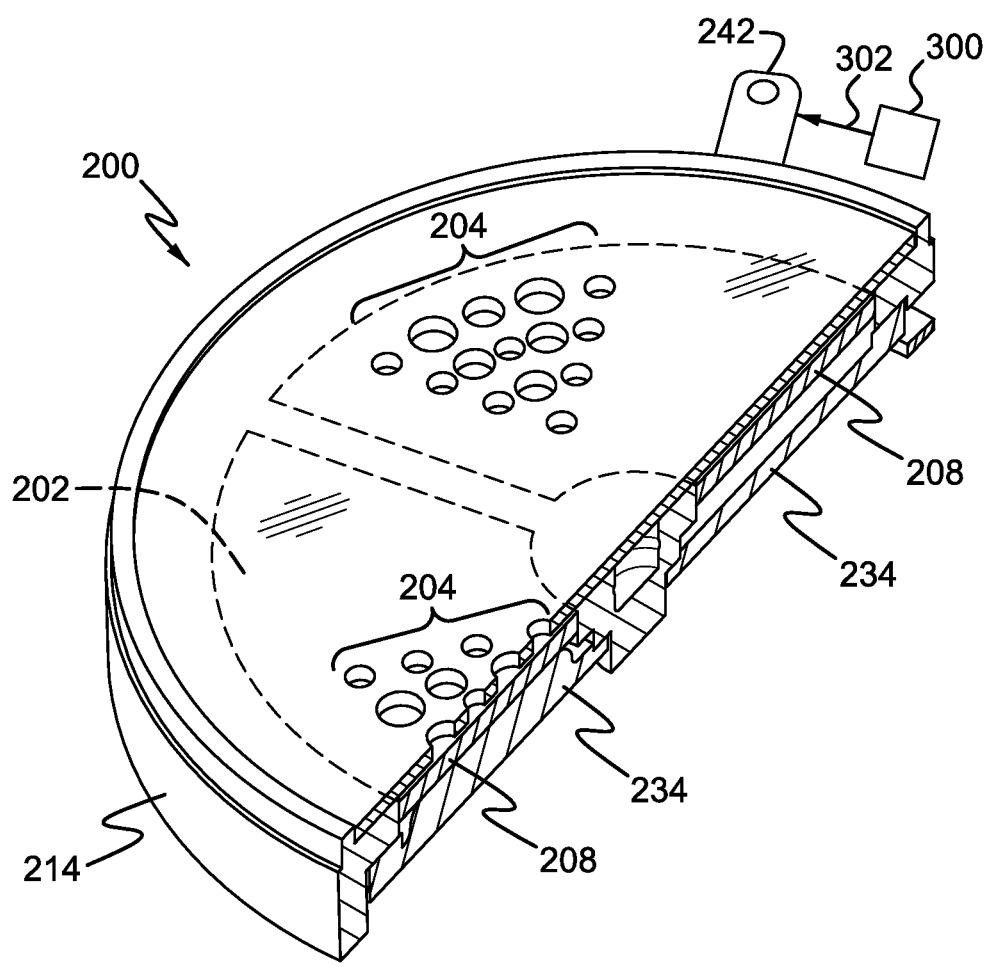
FIG. 3 shows a cross-sectional view of the switchable engine mount shown in FIG. 2.

FIG. 3 shows a cross-sectional view of the switchable engine mount 200. The end plate 202, channel plate 214, switching plate 234, and decoupler plates 208 are depicted in FIG. 3. As shown, the end plate 202 is positioned in a recess of the channel plate 214. Thus, the channel plate partially encloses (e.g., circumferentially encloses) the end plate 202. As shown, the decoupler plates 208 are positioned between the end plate 202 and the switching plate 234. The groups 204 of openings included in the end plate 202 are also shown in FIG. 3. It will be appreciated that fluid may travel through the groups of openings into cavities in the switchable engine mount 200, during certain operating conditions. The ramp element is omitted from the switchable engine mount 200 shown in FIG. 3.

An actuator 300 is shown in FIG. 3. The actuator 300 is configured to provide an actuation force, denoted via arrow 302, to the actuation arm 242. In this way, an actuation force may be imparted to the switching plate 234. The actuator 300 may receive signals from a controller such as the controller 100 shown in FIG. 1. The actuator 300 may be a solenoid valve in one example.

Figure 4:
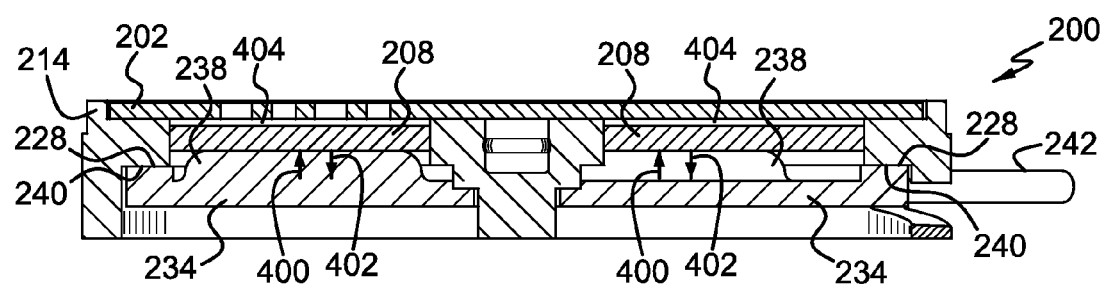
FIG. 4 shows another view of the cross-section of the switchable engine mount shown in FIG. 3.

FIG. 4 shows another view (i.e., side view) of the cross-sectional of the switchable engine mount 200 shown in FIG. 3. The end plate 202, channel plate 214, switching plate 234, and decoupler plates 208 are depicted in FIG. 4. The channel plate angled ramps 228 are in face sharing contact with the switching plate angled ramps 240. Thus, the aforementioned angled ramps mate with one another. It will be appreciated that when the switching plate 234 is rotated via an actuation force, such as the actuation force discussed above, the mated surface in the angled ramps (228 and 240) may urge the switching plate in an axial direction. Specifically, the ramps in the switching plate travel in a helical direction, moving the actuation protrusions 238 toward, indicated via arrow 400, and away, indicated via arrow 402, from the end plate 202. In this way, the switchable engine mount 200 may be actuated into a first configuration and a second configuration. In the first configuration movement of the decoupler plates 208 is substantially inhibited. This is achieved by implementing face sharing contact between one side of the decoupler plates 208 and the end plate 202 and face sharing contact between the opposing sides of the decoupler plates and the actuation protrusions. In the second configuration movement of the decoupler plates 208 is permitted. Thus, in the second configuration the decoupler plates 208 are spaced away from the end plate 202. Therefore, it will be appreciated that fluid may fill gaps 404 between the end plate and the decoupler plates 208 in the second configuration. The switchable engine mount 200 is depicted in the second configuration in FIG. 4. The actuation arm 242 is also shown in FIG. 4.

Figure 5:
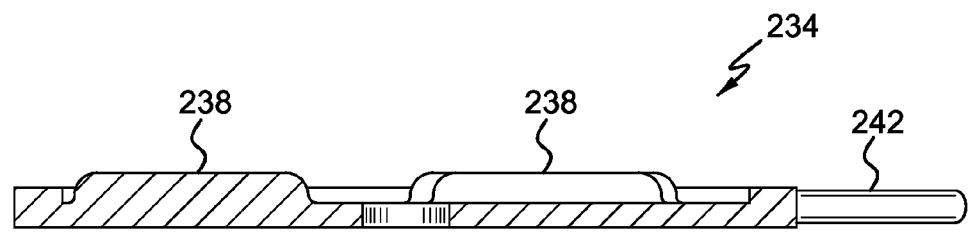
FIG. 5 shows a cross-sectional view of a switching plate included in the switchable engine mount shown in FIG. 2.

FIG. 5 shows the switching plate 234 included in the switchable engine mount 200, shown in FIG. 4. The actuation protrusions 238 and actuation arm 242 included in the switching plate 234 are illustrated.

Figure 6:
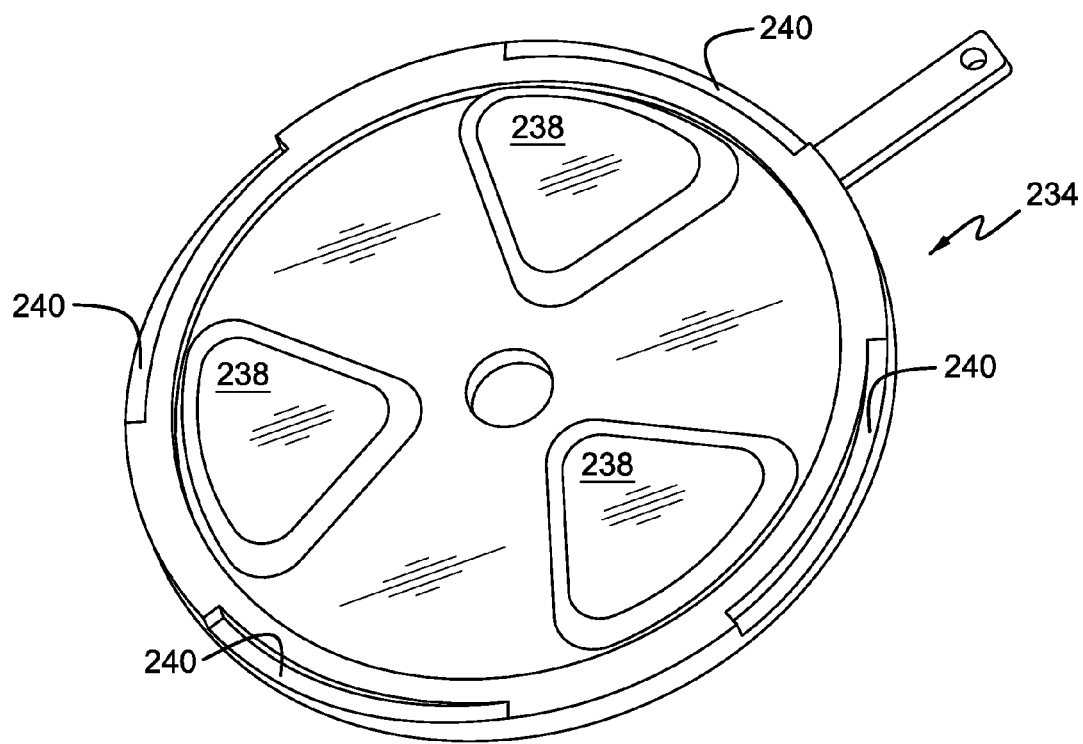
FIG. 6 shows a perspective view of the switching plate included in the switchable engine mount shown in FIG. 2.

FIG. 6 shows another view of the switching plate 234 included in the switchable engine mount 200, shown in FIG. 2. The actuation protrusions 238 and actuation arm 242 included in the switching plate 234 are illustrated. The angled ramps 240 are also depicted in FIG. 6.

Figure 7:
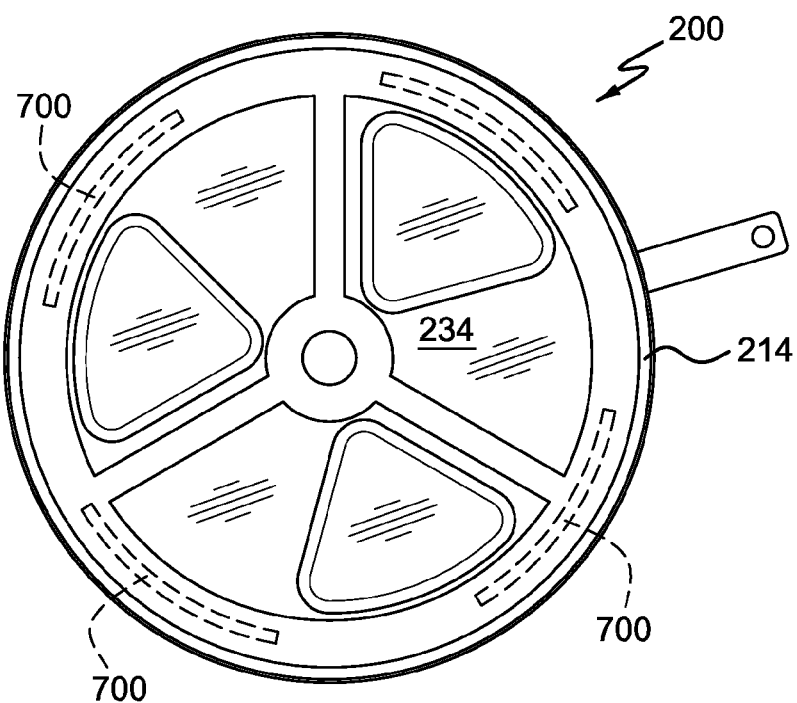
FIGS. 7 and 8 shows the switchable engine mount illustrated in FIG. 2 with different return force elements.

FIG. 7 shows the switchable engine mount 200 illustrated in FIG. 2. A return force element 700 may be provided in the mount to generate a return force opposing an actuation force on the actuation arm 242, such as the actuation force 302, shown in FIG. 3. In this way, the actuator may only apply an actuation force in a single direction, simplifying operation of the actuator. The return force element 700 includes sections of elastic material (molding rubber, elastomeric material) in the example depicted in FIG. 7. The sections are positioned between the switching plate 234 and the channel plate 214. In this way, the sections provide an elastic return force in response to decreasing the axial separation between the end plate and the switching plate 234. It will be appreciated that the end plate has been omitted from the mount shown in FIG. 7 to reveal components positioned under the end plate.

Figure 8:
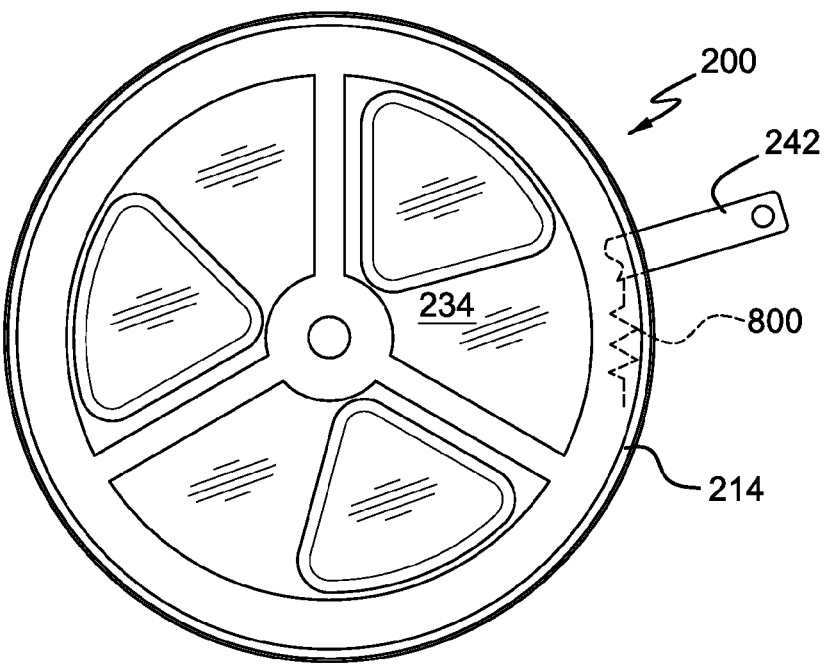

FIG. 8 shows the switchable engine mount 200 illustrated in FIG. 2. Another type of return force element 800 is provided in the mount shown in FIG. 8 to generate a return force opposing an actuation force. The return force element 800 includes a spring (e.g., metallic spring) in the example shown in FIG. 8. It will be appreciated that the spring included in the return force element 800 generated a return force on the actuation arm 242. The switching plate 234 and the channel plate 214 are also shown in FIG. 8.

FIG. 9 shows a method 900 for operating a switchable engine mount. The method 900 may be implemented via the switchable engine mount discussed above with regard to FIGS. 1-8 or may be implemented via another suitable switchable engine mount.

At 902 the method includes receiving an actuation force from an actuator at a switching plate positioned below a decoupler and a channel plate coupled to a top plate including one or more hydraulic flow openings. In one example, the actuation force is in a circumferential direction. In another example, the actuation force is in a horizontal direction.

Next at 904 the method includes axially urging the decoupler toward a top plate in an axial direction in response to receiving the actuation force to switch the switchable engine mount into a first configuration where movement of the decoupler is inhibited, the first axial direction forming a non-parallel angle with the direction of the actuation force. In one example, the non-parallel angle is a perpendicular angle.

At 906 the method includes receiving a second actuation force at the switching plate, the second actuation force opposing the first actuation force. It will be appreciated that in some examples the second actuation force may be generated via a return force element. Further in other examples the second actuation force may be generated via the actuator.

Next at 908 the method includes axially urging the decoupler away from the top plate in a second axial direction in response to receiving the second actuation force to switch the switchable engine mount into a second configuration where movement of the decoupler is permitted.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A switchable engine mount comprising:
an end plate including variably sized openings in fluidic communication with a hydraulic source;
a channel plate coupled to the end plate and including hydraulic flow openings;
a decoupler including one or more decoupler plates enclosed by the channel plate and the end plate;
a switching plate positioned adjacent to the decoupler to axially actuate the decoupler and one or more actuation protrusions of the switching plate via an input force non-parallel to the axial actuation; and
wherein in at least a first configuration, there is face sharing contact on both sides of the decoupler plates, a first side in contact with the end plate and a second, opposing side in contact with a topmost surface of the actuation protrusions of the switching plate.

2. The switchable engine mount of claim 1, where the switching plate includes an actuation arm coupled to an actuator and extending through an opening in the channel plate.

3. The switchable engine mount of claim 1, where the switching plate includes an angled switching plate ramp extending in an axial direction in face sharing contact with an angled channel plate ramp included in the channel plate.

4. The switchable engine mount of claim 3, where the switching plate angled ramp and the channel plate angled ramp extend in an axial direction.

5. The switchable engine mount of claim 4, where the switching plate angled ramp and the channel plate angled ramp are helically aligned.

6. A switchable engine mount comprising:
an end plate including one or more variably sized openings in fluidic communication with a hydraulic source;
a channel plate coupled to the end plate and including one or more hydraulic flow openings;
a decoupler including at least one decoupler plate at least partially enclosed by the channel plate and the end plate;
a switching plate positioned adjacent to the decoupler and configured to axially actuate the decoupler via one or more actuation protrusions included in the switching plate extending in a vertical direction in response to reception of an input force from an actuator, the input force non-parallel to the axial actuation; and
wherein in at least a first configuration, there is face sharing contact on both sides of the decoupler plates, a first side in contact with the end plate and a second, opposing side in contact with a topmost surface of the actuation protrusions of the switching plate.

7. The switchable engine mount of claim 6, where axial actuation includes applying an axial force to the decoupler to substantially inhibit and permit fluid flow through the one or more variably sized openings of the end plate.

8. The switchable engine mount of claim 6, where the switchable engine mount is switchable to a second configuration where the decoupler is permitted to move in an axial direction.

9. The switchable engine mount of claim 6, where the switching plate and the decoupler are at least partially enclosed by the end plate and the channel plate.

10. The switchable engine mount of claim 6, where the hydraulic source is a hydraulic chamber in the switchable engine mount.

11. The switchable engine mount of claim 6, where the switching plate includes an actuation arm coupled to the actuator.

12. The switchable engine mount of claim 6, where the switching plate includes an angled switching plate ramp extending in an axial direction in face sharing contact with an angled channel plate ramp included in the channel plate.

13. The switchable engine mount of claim 12, where the switching plate angled ramp and the channel plate angled ramp extend in an axial direction.

14. The switchable engine mount of claim 13, where the switching plate angled ramp and the channel plate angled ramp are helically aligned.

15. A method for operating a switchable engine mount comprising:

receiving a first actuation force from an actuator at a switching plate positioned below a decoupler and a channel plate coupled to an end plate including one or more variably sized hydraulic flow openings;

axially urging the decoupler toward the end plate in a first axial direction via actuation protrusions, the first axial direction forming a non-parallel angle with a direction of the first actuation force; and forcing decoupler plates of the decoupler in response to receiving the first actuation force to switch the switchable engine mount into a first configuration where movement of the decoupler is inhibited by face sharing contact on both sides of the decoupler plates, a first side in contact with the end plate and a second, opposing side in contact with a topmost surface of the actuation protrusions of the switching plate.

16. The method of claim 15, where the first actuation force is in a circumferential direction.

17. The method of claim 15, further comprising receiving a second actuation force at the switching plate, the second actuation force opposing the first actuation force; and axially urging the decoupler away from the end plate in a second axial direction in response to receiving the second actuation force to switch the switchable engine mount into a second configuration where movement of the decoupler is permitted.

18. The method of claim 15, where the non-parallel angle is a perpendicular angle.

19. The method of claim 15, where the first actuation force is in a horizontal direction.

\* \* \* \* \*